W. LUXMORE.
FLOUR SIFTER.
APPLICATION FILED OCT. 5, 1914.
1,152,650.
Patented Sept. 7, 1915.
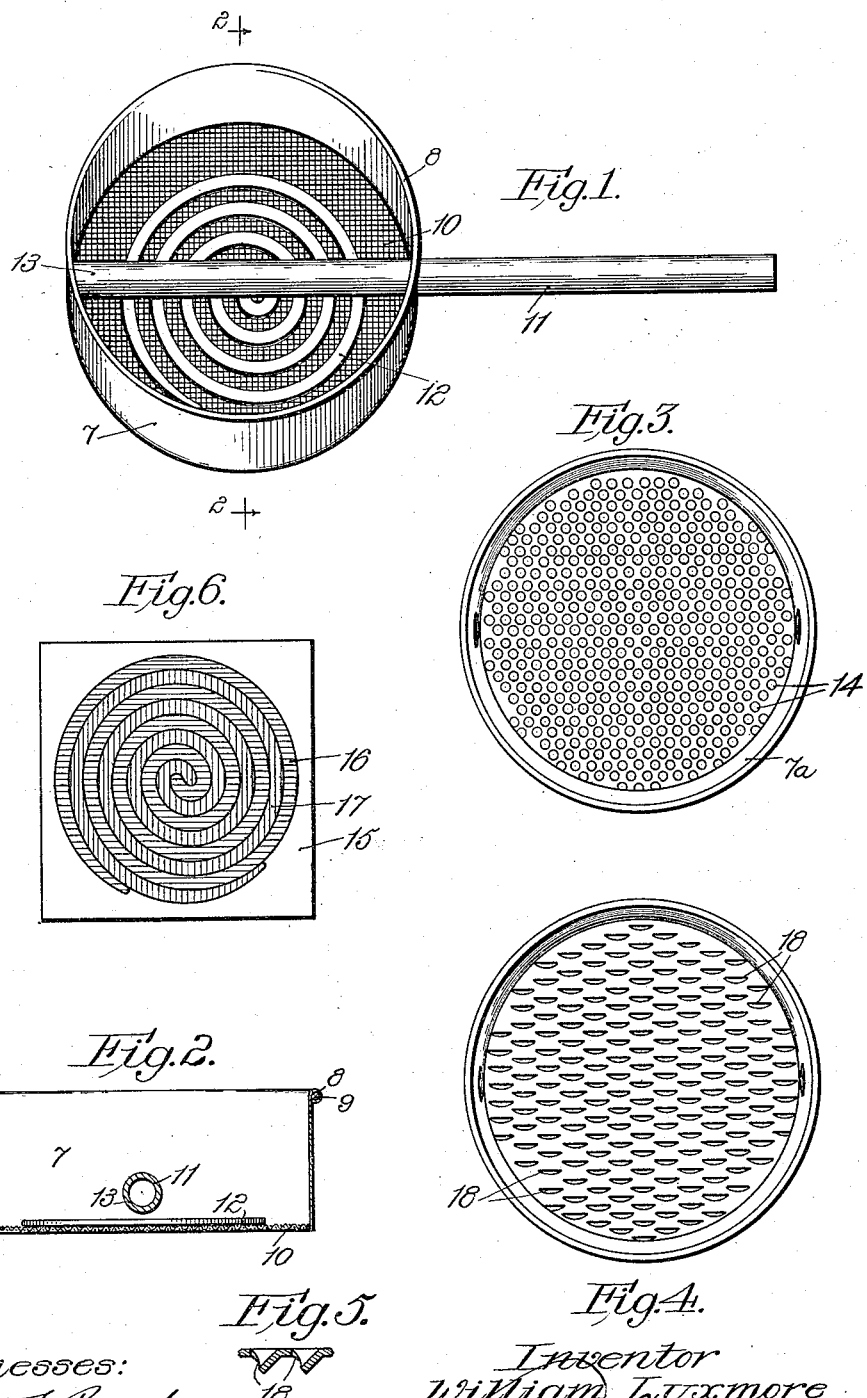

UNITED STATES PATENT OFFICE.

WILLIAM LUXMORE, OF CHICAGO, ILLINOIS.

FLOUR-SIFTER.

1,152,650.  Specification of Letters Patent.  Patented Sept. 7, 1915.

Application filed October 5, 1914. Serial No. 865,146.

*To all whom it may concern:*

Be it known that I, WILLIAM LUXMORE, a citizen of the United States, residing at Chicago, in the county of Cook and State of Illinois, have invented certain new and useful Improvements in Flour-Sifters, of which the following is a full, clear, concise, and exact description, reference being had to the accompanying drawings, forming a part of this specification.

My invention relates to flour sifters, and has for its object the provision of a household utensil of this class which can be very cheaply manufactured.

A further object of my invention is the provision of a sifter which can be effectively operated by any one of a number of movements imparted to it by the hand or arm of the operator, thereby eliminating the usual fatigue experienced by the operator in operating the devices of the prior art, due to the constant repetition of one movement of the hand or arm.

My invention will be more clearly understood by referring to the accompanying drawings, in which,—

Figure 1 is a perspective view of the flour sifter of my invention; Fig. 2 is a transverse cross-sectional view of the sifter, taken along the line 2—2 of Fig. 1 and looking in the direction indicated by the arrows; Fig. 3 is a modified form of receptacle which may be employed in connection with the handle and agitator shown in Fig. 1 (in this modification the sides and bottom of the receptacle are an entire unit); Fig. 4 is a second modified form of receptacle, somewhat similar to that shown in Fig. 3; Fig. 5 is a fragmentary sectional view of the bottom of the receptacle shown in Fig. 4; and Fig. 6 is a plan view of a section of sheet-metal, showing the method of cutting or stamping the spiral agitators from the sheet-metal.

Similar reference characters refer to similar parts throughout the several views.

Referring to Fig. 1, I have shown a receptacle at 7, formed of sheet-metal and provided at its upper edge with a bead 8, through which a wire 9 may be inserted if desired. Held by the receptacle and forming the bottom thereof is a screen 10. This screen may be held in any suitable manner by the receptacle 7, by means of a ring or by means of turning the lower edge of the receptacle 7. Extending through apertures in the receptacle 7 is a handle 11, which may be in the form of a metal tube, the tube being held to the receptacle in any suitable manner. Freely disposed between the handle 11 and the screen 10 is a spiral agitator 12.

In assembling the device of my invention, the agitator 12 is first placed upon the screen 10, whereupon the handle 11 is inserted through the apertures provided in the receptacle, and then rigidly secured to the receptacle; the portion 13 of the handle which extends directly above the agitator preventing the removal of said agitator.

In the modification shown in Fig. 3, I provide a receptacle 7ª, which may be pressed out of sheet-metal and the apertures 14 provided in the bottom thereof. Attention is called to the fact that the apertures in this figure are slightly exaggerated, but are made smaller in practice, so as to resemble the screen shown in Fig. 1.

In Fig. 4, I have shown a second modification, also arranged to be stamped out of sheet-metal, the bottom and sides being formed of one piece. The apertures illustrated in this modification are made by providing a plurality of slits 18, 18 in the bottom of the receptacle, one side of each slit being then stamped downwardly, as clearly shown in Fig. 5, to provide the necessary aperture. The apertures shown in this figure are also exaggerated, as the slits in practice would be made very much smaller.

In Fig. 6, I have shown a blank of sheet-metal 15, from which may be cut a first spiral 16, and a second spiral 17, thereby utilizing all of the metal between the convolutions of the first spiral. In this manner I am enabled to greatly reduce the cost of manufacture of the agitator.

As clearly shown in Fig. 1, the agitator 12 may be caused to reciprocate in a direction parallel to the axis of the handle 11. The agitator may also be caused to reciprocate in a direction at right angles to the axis of the handle. In fact, it may be caused to take movement in any direction at right angles to the axis of the screen or a rotary movement in a plane parallel to the plane of the screen. The handle 11 may if desired be removably secured to the casing 8 so that the agitator may be removed to facilitate the use of the device as a strainer for jelly, etc.

Having thus described my invention, what I claim as new, and desire to secure by United States Letters Patent, is:

1. The combination of a receptacle, a perforated bottom for said receptacle, a handle extending through said receptacle and disposed above said bottom, and an agitator freely disposed between said handle and bottom.

2. The combination of a receptacle, a perforated bottom for said receptacle, a handle extending through said receptacle and disposed above said bottom, and an agitator freely disposed between said handle and bottom arranged to slide in any direction in a plane parallel to the bottom.

3. The combination of a receptacle, a perforated bottom for said receptacle, a handle extending through said receptacle and disposed above said bottom, and a spiral-shaped agitator freely disposed between said handle and bottom arranged to slide in any direction in a plane parallel to the bottom.

In witness whereof, I hereunto subscribe my name this 3rd day of October, A. D. 1914.

WILLIAM LUXMORE.

Witnesses:
ROBERT F. BRACKE,
ALVIN C. AHLBERG.

Copies of this patent may be obtained for five cents each, by addressing the "Commissioner of Patents, Washington, D. C."